United States Patent Office.

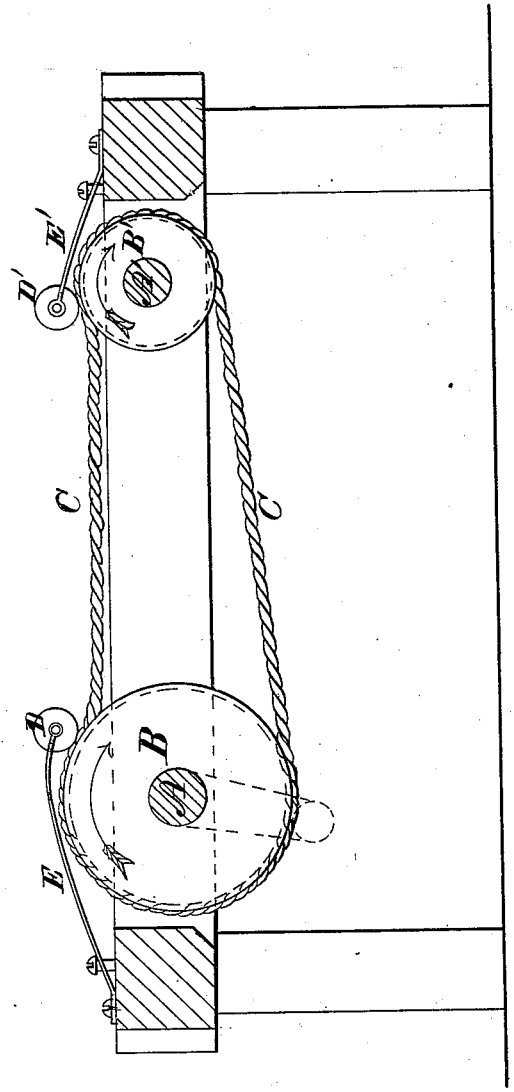

SAMUEL PATTON, OF CHATSWORTH, ILLINOIS.

Letters Patent No. 81,285, dated August 18, 1868.

IMPROVED BELT-TIGHTENER.

The Schedule referred to in these Letters Patent and making part of the same.

TO ALL WHOM IT MAY CONCERN:

Be it known that I, SAMUEL PATTON, of Chatsworth, in the county of Livingston, and State of Illinois, have invented a new and improved Belt-Tightener; and I do hereby declare that the following is a full, clear, and exact description of the construction and operation of the same, reference being had to the accompanying drawing, making a part of this specification, in which—

My invention is represented by a longitudinal vertical section.

The object of this invention is to provide a simple and effective attachment to belt-pulleys, by which the belt can be tightened to any required degree without difficulty.

This object is fully attained by employing two small revolving drums, which clamp the belt to its pulleys, the drums having spring bearings, and being so constructed and supported that they can be made to press against the belt with any required degree of force.

In the drawings, A A' are the shafts, and B B' the belt-pulleys, C being the belt. To tighten the latter, I employ the drums D D', supported in spring bearings E E', which can be adjusted by screws F F', or other regulating-device, so as to press with any required force upon the pulleys B B, or upon the belt C. The tightening-pulleys are so arranged that they press against the belt, at some point where it is in contact with its pulleys, and bear it down against their surface, the drums operating on the same side or upon different sides of the belt-pulleys. By this means, the belt is held tightly against the surface of the pulleys, and is kept tightened on one side, hanging slack on the other side between them.

This device keeps the belt so completely in contact with the face of its pulleys that motion is transmitted from one shaft to the other, with perfect uniformity and certainty, even though one side of the belt hangs slack, as shown in the drawings.

Having thus described my invention, what I claim as new, and desire to secure by Letters Patent, is—

1. The arrangement of the drums D D', in connection with the belt C and pulleys B B', in such a manner that the drums press the belt directly against the surface of the pulleys, substantially as described.

2. The combination and arrangement of the belt C, drums D D', pulleys B B', spring bearings E E', and adjusting-screws, or their equivalent, F F', substantially as shown and described.

SAMUEL PATTON.

Witnesses:
CHAS. A. PETTIT,
SOLON C. KEMON.